Dec. 3, 1963     T. F. PAULS     3,112,559
HOLLOW ARTICLES
Filed Oct. 24, 1960     3 Sheets-Sheet 1
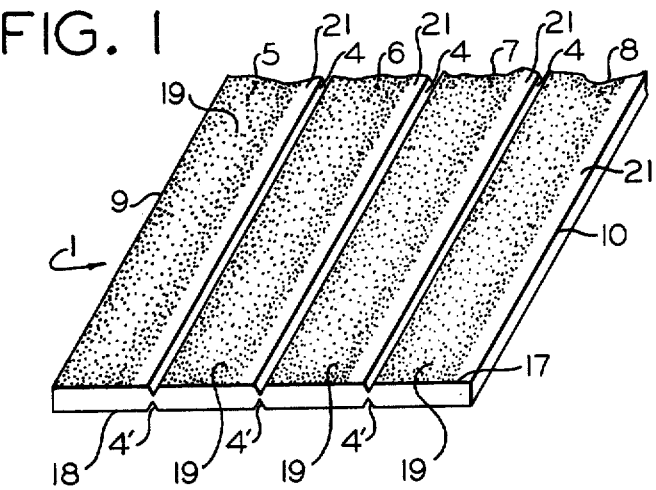
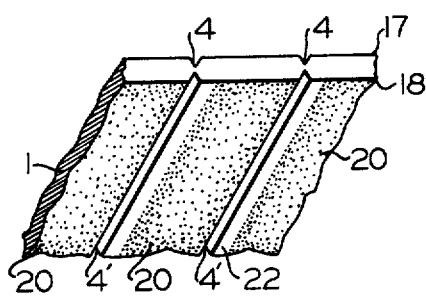
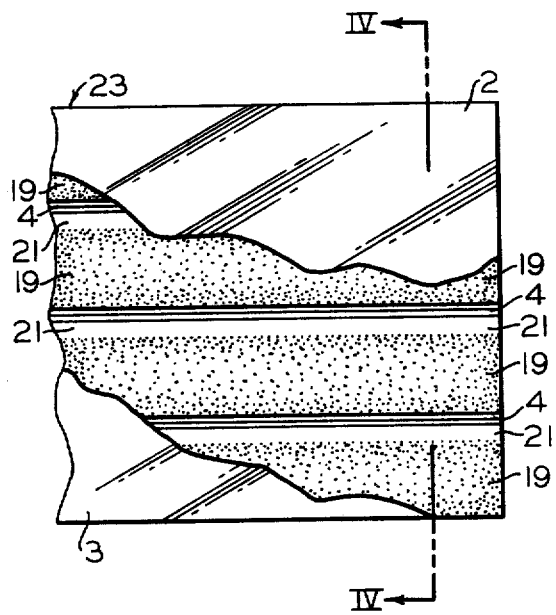
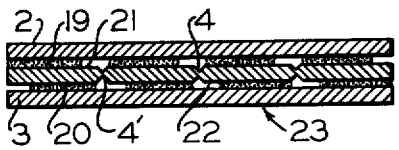
INVENTOR.
THERON F. PAULS
BY
ATTORNEYS Dec. 3, 1963    T. F. PAULS    3,112,559
HOLLOW ARTICLES
Filed Oct. 24, 1960    3 Sheets-Sheet 2

INVENTOR.
THERON F. PAULS
ATTORNEYS

Dec. 3, 1963  T. F. PAULS  3,112,559
HOLLOW ARTICLES

Filed Oct. 24, 1960  3 Sheets-Sheet 3

INVENTOR.
THERON F PAULS
BY
ATTORNEYS

United States Patent Office 3,112,559
Patented Dec. 3, 1963

3,112,559
HOLLOW ARTICLES
Theron F. Pauls, Alton, Ill., assignor to Olin Mathieson Chemical Corporation, Alton, Ill., a corporation of Virginia
Filed Oct. 24, 1960, Ser. No. 64,593
4 Claims. (Cl. 29—157.3)

This invention relates to hollow articles and more particularly to a method of making hollow articles adapted for use as structural panels.

Although in the fabrication of structural panels from sheet metal various methods have heretofore been employed, they have all been subject to various disadvantages. For example, one method involves providing, by cutting and the like, a plurality of individual units or components, with or without forming, assembling them together and then joining them together by welding, riveting and the like. Another method involves assembling corrugated inner sheets between a bottom and top sheet and then resistance welding the sheets together by either spot-welding or continuous welding at the points of contact of each crest of the corrugation of the inner sheet. The above methods require the use of excess and additional material in the form of welds and/or rivets which appreciably increase the weight and cost of the completed structure.

It has been proposed to overcome the aforesaid disadvantages by forming such structural panels from a plurality of individual and separate strips of metal interposed in side-by-side and/or superposed relationship between a pair of outer sheets with bands of stop-weld material disposed opposite the portions of the strips designed to form integral reinforcing ribs extending between and transverse the cover sheets which form the outer walls of the structural panel.

Although this proposed method overcomes the disadvantages of the methods preceding it, it nevertheless, suffers in the disadvantage of requiring the handling of large number of components and care in the assembly of the components in proper relation and register with each other.

It has been discovered that all the aforesaid disadvantages can be overcome by the use, between a pair of outer sheets, of at least one inner sheet properly treated to form a substantial equivalent of the strips discussed in the above last said method. Generally speaking, this may be accomplished by providing a plurality of weakened portions in the inner sheet by scoring across this inner sheet along a plurality of spaced lines extending across said sheet in a direction parallel to a pair of opposite edges thereof so that said scoring divides this inner sheet into a plurality of sections corresponding to the number of ribs desired. Thereafter, stop-weld or weld-inhibiting material is applied to both sides of these sections in the portions thereof designed to form the desired rib portions of the structural panel. Subsequently the inner sheet is assembled between two outer sheets, and the assembly pressure welded together to form a unitary structure.

The opposite faces or sides of the assembly are then spaced apart into their desired spatial relationship by any suitable means known in the art, such as mandrels and preferably vacuum platens, under sufficient force to tear the inner sheet along its weakened portion, so as to separate the sections of it, and to erect the sections into the desired ribs integrally extending between opposite walls of the resultant structural panel. In accordance with this invention, as will be pointed out herein, various shaped integral ribs can be formed between opposed walls of the structural panel. For example, the weld-inhibiting material can be applied to each section of the scored inner sheet in a pattern provided so that, in the portions of all sheets adjacent one section of the inner sheet, the band of material between one pair of adjacent faces will be in staggered and overlapping relationship to a band of the weld-inhibiting material between a successive pair of adjacent faces. By this pattern, the portions of each section adjacent diagonally opposed edges, defining them, become welded to adjacent sheets with the portions of the sections between the overlapping portions of the applied bands of weld-inhibiting material forming, upon pressure welding and distention, the desired ribs integrally extending between the opposed walls of the structural panel.

Accordingly, it is an object of this invention to provide a novel method for fabricating structural panels eliminating disadvantages of the prior art.

Another object of this invention is to provide a novel method for fabricating structural panels from metal sheet stock adapted to be fabricated by conventional pressure welding techniques.

It is still another object of this invention to provide a novel method for making structural panels of unitary construction and maximum strength free of any discontinuities in the portions of the metal unified in the making of the structure.

Other objects and advantages will become more apparent from the following description and drawings in which:

FIGURE 1 is a partial view in perspective of a section illustrating a sheet component for the fabrication of a structural panel treated in accordance with one embodiment of this invention;

FIGURE 2 is a partial view in perspective illustrating a section of the opposite face of the sheet component depicted in FIGURE 1;

FIGURE 3 is a partial plan view in section illustrating an assembly of sheet components incorporating the embodiment depicted in FIGURE 1;

FIGURE 4 is a sectional view taken along lines IV—IV of FIGURE 3;

Figure 5:
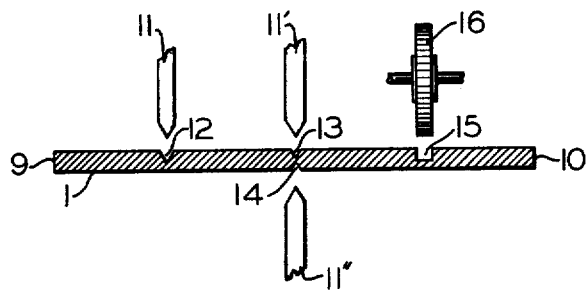
FIGURE 5 is a plan view partly in section illustrating various modes of treating the sheet component illustrated in FIGURE 1.

Referring to the drawings, FIGURE 1 illustrates a metal sheet component 1, such as AA 1100 type aluminum alloy, which is to be assembled between a pair of outer component sheets 2 and 3, and from which component sheet 1, the desired number of ribs are to be formed to integrally connect and extend between the walls of the desired structural panel. In accordance with this invention component sheet 1 is adapted for the formation of these ribs by providing, by well known means, a number of weakened portions 4 and 4' on opposite faces 17 and 18, respectively, necessary to divide component sheet 1 into sections 5, 6, 7, and 8 corresponding to the number of ribs desired between the walls of the structural panel.

These weakened portions are obtained by scoring component sheet 1 along a plurality of lines which are spaced from each other and which extend parallel to the pair of opposite edges 9 and 10 of component sheet 1. Generally, these scoring lines will extend in a direction which will be longitudinal with the direction of subsequent rolling with the scoring lines parallel to the lateral edges of sheet 1. Such scoring may be provided by various means well known in the art. For example, this may be done by a pointed tool 11 which may be compressively applied against sheet 1 with sufficient pressure to indent the sheet, without removing metal, into a groove 12 on only one side of component sheet 1. Alternatively, the weakened portion or groove 12 may be formed by dragging the pointed tool 11 across component sheet 1 so as to remove metal. If desired, and preferably, the weakened portion of component sheet 1 may be provided by grooving or indenting the metal on both sides of the component sheet at 13 and 14 by similar type of reciprocating tools 11' and 11" cooperating with each other in opposed relationship. A still further manner by which a groove 15 may be provided to obtain the desired weakened portions of the sheet is by any conventional rotary tool 16. As will be obvious, where sheet 1 is to be scored on both sides for the provision of the weakened portions, the scoring will be done in the respective portions of the opposite sides of the sheet so that the corresponding scored grooves on each side will overlie and be in register with each other.

After provision of the scored weakened portions 4 and 4' on sheet 1, if necessary, the sheet may be given any suitable treatment such as a preliminary cleaning or wire brushing of the fraying surfaces in order to adapt the sheet for unification by welding. Thereafter, each of the sections 5, 6, 7 and 8 of sheet 1 are coated with a suitable weld-inhibiting material, such as graphite in water glass, on both sides of the sections. As illustrated, duplicated on each of the sections are patterns of the weld-inhibiting material applied as bands 19 and 20 on both sides on each section 5, 6, 7 and 8. As shown, the bands of weld-inhibiting material 19 and 20 are applied so that they will be disposed adjacent diagonally opposed lateral edges defining each of the sections. As can be seen the coating of weld-inhibiting material is applied to each of sections 5, 6, 7 and 8 so as to provide bands 21 and 22 free of weld-inhibiting material on the opposite sides and disposed adjacent diagonally opposed lateral edges of each of the sections. In the specific embodiment described, the bands of weld-inhibiting material 19 and 20 on each of the sections of sheet 1 are in staggered and overlapping relationship, with the parts of each section between the overlapping portions of the weld-inhibiting material corresponding to the ribs desired between opposed walls of the ultimate structural panel as depicted in FIGURE 4. Subsequent to the application of the weld-inhibiting material the component sheet 1 is assembled between a pair of outer sheets 2 and 3 to form an assembly of components 23 illustrated in FIGURES 3 and 4. It is to be understood that the spacing of the components in FIGURE 4 is illustrated in exaggerated form to denote more clearly the application of weld-inhibiting material between the adjacent surfaces of the outer or cover sheets 2 and 3 and each of the sections of the component or inner sheet 1. Generally, the thickness of the weld-inhibiting material employed will be of the order of 0.001 of an inch, which will be the distance of the spacing of the various component sheets. However, as will be obvious, smaller or greater thicknesses of weld-inhibiting material will be employed between the various component sheets. Also, although in this embodiment all of sections 5, 6, 7 and 8 have been illustrated as of equal width, it is to be understood that where a structural panel of angular dimension is desired, the width of the sections of component sheet 1 will be progressively decreased.

After assembly of the various components, as illustrated in FIGURES 3 and 4, they may be suitably secured together against separation in any appropriate manner, not shown, as by spot-welding at the corners of the stack or any other suitable manner.

Although a specific aluminum alloy has been referred to in the foregoing example, it is to be understood that a variety of metals may be employed depending not only upon economic considerations but particularly upon a specific application to which the panel is put. Thus, the final structural panel of this invention can be made from other aluminum alloys including heat treatable alloys, copper alloys, titanium, zirconium, steel or similar alloys. Similarly, any weld-inhibiting material capable of preventing welding of juxtaposed surfaces may be substituted for the specific weld-inhibiting material described above. Also the metal sheets and metal strips employed may be of any combination of metals for any desired application. For example, if the panel is to be employed for the outer walls of buildings, it is generally preferred that the panel be not only light weight, but in addition, resistant to the elements. For this application, it is readily seen that aluminum is not only suitable, but preferred since it is both relatively light in weight and resistant to oxidation. However, if the structural panel is intended for application which requires it to withstand any type of a more severe loading force, it is readily seen that the panel may be of either heavier gauge or of other metal or a combination of the two. Thus, if the panel is intended for heavier application, such as floor beds in trucks, the panel may be formed of steel and the like. In addition, where the panel is intended for application in forming bodies of trucks, it will be understood that the structural panel of the floor beds may be formed of steel, whereas the structural panel for the side walls may be formed of aluminum alloys which side walls may be adapted to contain a heat exchange fluid for temperature control if refrigeration is desired.

Similar variables also apply with respect to the specific gauges of the metals employed since the thickness of the metal will vary according to the application intended for the final fabricated unit. Accordingly, the gauges of the components may be selected to give a uniform cross-sectional thickness in all of the components, or any desired variation in thickness between the outer walls and the interconnecting webs or legs between the outer walls. In like manner, the components may be selected from various combinations of metals to provide specific physical properties in the outer surfaces distinguishable from the physical properties in the legs or interconnecting members between them.

In light of the variables pointed out above, it is readily seen that the amount of scoring required is necessarily dependent on the specific combination and dimensions of the component sheets employed in the fabrication of the structural panel. It is only necessary that the scoring be sufficient to enable the inner or component sheet 1 to tear along its weakened portions, formed by scored lines 4 and 4', when the outer walls of the subsequently pressure welded stack are spaced apart to the spatial dimensions of the desired structural panel. For example, the amount of scoring will also be dependent in addition to the variables indicated above to the amount of force desired for spacing outer walls, of the subsequently pressure welded assembly, apart. Although the amount of scoring required is necessarily on various variables of each application, the specific amount can be readily determined by those skilled in the art by reference to the physical properties of the component employed and/or to various standard texts.

Also, the panels may be fabricated in any suitable standard lengths for forming either partition walls or exterior walls of buildings. As will be obvious, the panel may be fabricated to suitable dimensions so that it may be employed as a complete unitary structure for any desired application, such as flooring for trucks, airplanes and the like. Or, where a plurality of panels of standard length or width are used, the individual panels may be provided with various types of interconnecting means well known in the art. For example, the panels may be butt-welded to each other or the panels may be provided with projecting flanges so that they may be connected to each other by screw fastening means, spot welding, explosive rivets or bolts. When utilized in the erection of walls and buildings, these panels may in like manner be secured to the girder framework of the buildings.

Subsequent to securing the various sheet components together against separation, the pack 23 is then ready for pressure welding together of the components in accordance with conventional practices. Typical practices with which the panel may be welded together are set forth in the well known process for fabricating hollow panels, as refrigerator heat exchangers and the like disclosed in the patent to Grenell, U.S. 2,690,002, granted on September 28, 1954.

In accordance with conventional practice, the secured assembly of components may be heated in a suitable furnace to pressure welding temperatures, for example where the components are of aluminum alloys to about 900° F., and immediately rolled between a pair of mill rolls 24 and 25 to effect sufficient reduction such as of about 65% for aluminum alloys, necessary to pressure weld all adjacent areas of the stack not separated by the weld-inhibiting material. This pressure welding results in a substantially complete erasure of the interfaces between the components by interdispersion of the grains between adjacent surfaces. The resultant juncture is usually characterized by tensile strength equal to that of other seamless regions of the blank. As will be understood, the amount of reduction required to effect pressure welding will vary with the particular combination and the physical properties of the various combinations of component sheets employed. Generally, a reduction of the order of 35% will accomplish pressure welding of adjacent surfaces not separated by weld-inhibiting material, however, it will be understood that lower or higher percent reductions may be sufficient or required with different metals and/or different temperatures employed in the pressure welding operation.

Figure 6:
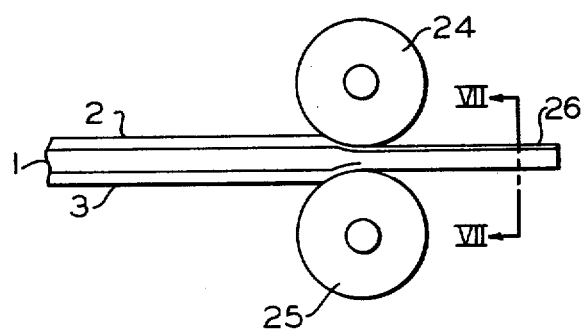
FIGURE 6 is a partial view in elevation illustrating unification of the assembly of components depicted in FIGURES 3 and 4.
Figure 7:
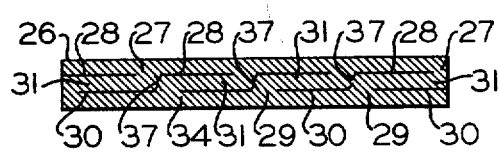
FIGURE 7 is a sectional view taken along lines VII—VII of FIGURE 6.
Figure 8:
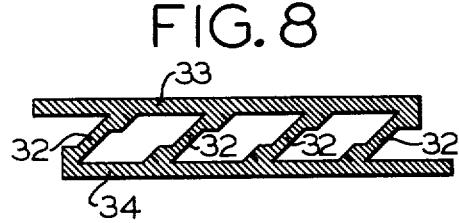
FIGURE 8 is a sectional side view of the blank of FIGURE 7 after partial distention thereof.
Figure 9:
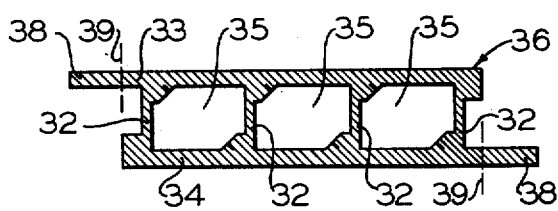
FIGURE 9 is a sectional side view illustrating the section of FIGURE 8 in fully distended form.

By reference to the resultant blank 26 of FIGURES 6 and 7 it can be seen that portions of each of the sections of inner component sheet 1 are welded to the outer sheets adjacent each side thereof with the areas of the adjacent surfaces separated by weld-inhibiting material remaining unwelded to provide laminations within the blank in accordance with the pattern of weld-inhibiting material utilized. Accordingly, the band 21 devoid of weld-inhibiting material on side 19 of the sections, of component sheet 1, results in the pressure welding of this portion of the sections to the outer sheet 2 adjacent thereto as at 27, whereas the adjacent surfaces between side 19 of the sections of sheet 1 and component sheet 2 separated by weld-inhibiting material result in laminations 28 between them. Similarly, the sections of inner component sheet 1 are pressure welded at 29 to the outer component sheet 3 adjacent the other side of sheet 1 leaving unwelded portions defining the laminations 30. As indicated in FIGURE 7, during pressure welding portions of outer component sheets 2 and 3 are extruded into the grooves formed by the scoring utilized for defining the sections of inner component sheet 1. Where severe reductions are employed in the pressure welding operation the extruded portions of outer component sheets 2 and 3 may be lightly tacked or welded to the adjacent surfaces of the grooves scored into inner component sheet 1. Such tack welding within the grooves produces welds of relatively much weaker strength than the welds obtained between the outer component sheets 2 and 3 and the adjacent portions of inner component sheet 1 were not scored. In subsequent separation or spacing apart of the outer sheets of the pressure welded blank 26 the force employed for the separation of the outer sheets of the pressure welded blank 26 will readily tear apart the weak weld formed in the grooves without in any manner affecting the desired weld between the component sheets. If desired, and preferably, the formation of these weak welds in the grooves can be prevented by the application of a small amount of weld-inhibiting material on the surfaces of the groove or by filling these grooves with weld-inhibiting material prior to pressure welding. By application of the weld-inhibiting material to the inner component sheet 1, as sectionalized in accordance with this invention, the component sheets of the stack 23 become selectively welded together to form a plait or a plaited portion 31 of an embryonic or undeveloped reinforcing member or rib 32 extending between and integral with the outer sheets or walls 33 and 34. Thus, as can be seen, the particular pattern of weld-inhibiting material employed between the various component sheets defines and forms a continuous section of an unwelded portion of metal, comprising the plaited portion 31, folded over upon itself. During subsequent expansion these plaited portions are caused to unfold to form the desired interconnected plaited portions or ribs 32 extending between and integral with the walls of the structural panel.

After pressure welding the unit is then ready for distention to separate the outer sheets 33 and 34 away from each other. However, if desired, prior to distention the blank 26 may be softened in any appropriate manner, as by annealing, for removing the effects of mechanical working, and thereafter cold rolled to provide a more uniform thickness to final gauge and again annealed. After treatment to obtain the specific conditions desired in the pressure welded blank, the outer walls 33 and 34 may be separated into the spacing desired between them by driving into the laminations a suitable mandrel, not shown, whose dimensions are graduated from a thin opening edge into a configuration corresponding to the configuration of the openings 35 formed in the structural panel. Alternately, any other suitable means may be employed within or to the surfaces of the pressure welded blank 26 to separate the outer sheets and to unfold the plaited portions, reinforcing ribs 32. For example, where the separation of the outer sheet is desired to be accomplished with fluid pressure, the assembly of components in stack 23 may be adapted to provide a fluid tight pressure welded blank adapted to contain a fluid under pressure in accordance with the teachings set forth in the U.S. patent to R. F. Adams, No. 2,766,514, granted October 16, 1956, or in accordance with the teachings set forth in co-pending application Serial No. 823,960, filed by Wallace C. Johnson on June 30, 1959.

An additional manner by which the outer sheets 33 and 34 of the pressure welded blank 26 may be separated into their desired spaced relationship is by the use of conventional vacuum platens applied to the outer faces of the pressure welded blank 26, with the platens exhausted to create the vacuum necessary to hold the outer walls against them with sufficient force to permit the separation of the outer walls into their desired spatial relationship. Irrespective of the manner by which the outer walls are spaced apart, it is only necessary to effect sufficient separation of the inner portions, plaited portion 31 of the blank 26, corresponding to the sections of component sheet 1, so that they move away from each other sufficiently to cause tearing in the portions of the blank corresponding to the scored or weakened portions initially provided in component sheet 1. After the tearing or separation of the plaited portions 31 from each other, along their common portions 37 defined by the scored portions of component sheet 1, the plaited portions 31 are free to unfold to form integral interconnecting members or reinforcing ribs 32 between the outer walls 33 and 34 of the structural panel 36. Although the tearing of the common portions 37 between the plaited portions 31 results in slight ragged edges thereat, such occurrence is immaterial since it will be contained and hidden on the inside of the structural panel, and may be of advantage in including turbulence when the structural panel is employed as a heat exchanger.

As will be understood the spatial relationship between outer walls 33 and 34 may be such that no elongation is induced in the reinforcing ribs 32, or to a spatial relationship which will cause the ribs to be elongated. As a result of the manner by which the structural panel 36 was obtained, upon separation of the outer walls to the desired spatial relationship these walls will have, in each adjacent pair of laterally extending flanges, a portion 38 of one extending beyond and further than the other. In order to provide a uniform structural panel, the extending portion 38 of the overlong flange may be suitably trimmed along line 39. As can be seen fabrication of structural panel 36 in accordance with this invention eliminates the necessity and labor of assembling a multiplicity of individual strips corresponding to sections 5, 6, 7 and 8 of inner component sheet 1, and permits the handling and treating of the single inner sheets, between the outer component sheets, as a single unit.

Figure 10:
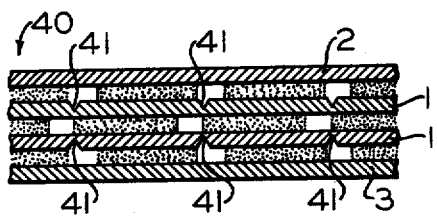
FIGURES 10 to 15 illustrate other various embodiments of this invention in their assembled form and in a corresponding distended form.
Figure 11:
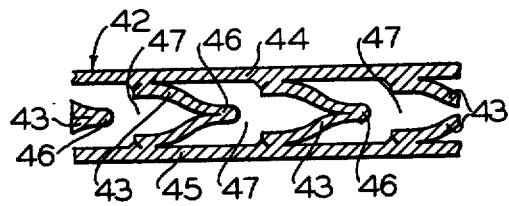

FIGURE 10 illustrates a modification of the preceding embodiments in which two identical inner component sheets 1 are employed between outer component sheets 2 and 3 to form an assembly of components 40. As can be observed each of the inner component sheets are divided into a plurality of sections by scoring at 41 only one side of each sheet with the pattern of weld-inhibiting material applied to provide bands of it at each successive pair of adjacent surfaces at successive alternate edges defining the sections of the inner component sheets. This modification results in a structural panel 42 having interconnecting ribs 43 between outer walls 44 and 45. The panel is shown in partially distended form in FIGURE 11 to illustrate the unfolding of the plaited portions formed as a result of this modification and to illustrate obtainment of flanges 46 which will project from the faces of the ribs 43. The provision of flanges 46 provides an additional advantage where the unit is desired to be employed as a heat exchanger since these flanges can be made to serve as fins for the transmission of heat from and into different heat exchange mediums employed in the tubular cross-sections 47 which will form between ribs 43.

Figure 12:
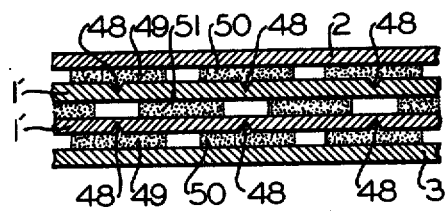
Figure 13:
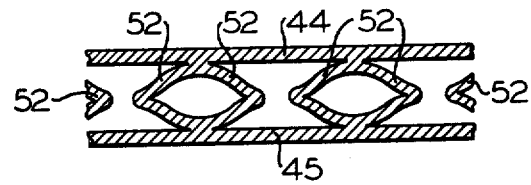

A further embodiment is illustrated in FIGURE 12 employing two inner component sheets 1' scored at 48 and assembled between outer component sheets 2 and 3. In this embodiment the band of weld-inhibiting material is applied to each section to provide bands of this material at 49 and 50 between alternate pairs of adjacent surfaces, and at 51 between the adjacent pairs of surfaces intermediate the alternate pairs. A partially formed structural panel fabricated in this embodiment is shown in FIGURE 13 illustrating partially developed ribs 52 between outer walls 44 and 45 formed by the unfolding of the plaited portions of this embodiment.

Figure 14:
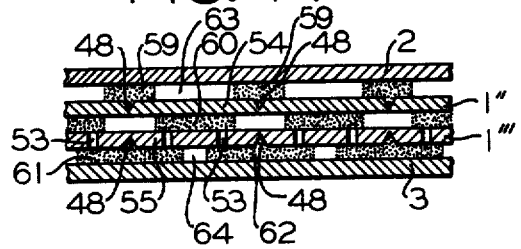
Figure 15:
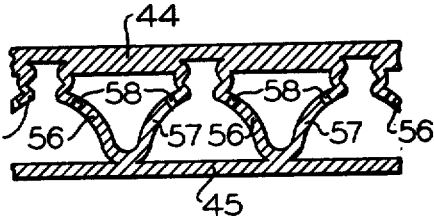

FIGURE 14 illustrates a modification of the embodiment of FIGURE 12 to show one of the means by which a construction in accordance with this invention can be obtained for distention by use of fluid pressures in the manners disclosed in the aforesaid patent to Adams and the co-pending application of Johnson. This embodiment is made by the use of ports 53 in sections 55 provided by the scoring of an inner component sheet. This modification includes the application of a pattern of weld-inhibiting material which results in forming the ribs 56 and 57 between the outer walls 44 and 45 in the triangular configuration, as illustrated in FIGURE 15, with the walls provided with openings 58 intercommunicating with all compartments between the ribs. The triangular configuration provides specific advantages in that the resultant structural panel will resist more lateral deflection when subjected to a force load. To obtain this modification or embodiment the inner component sheets 1" and 1'" are suitably scored on both sides or on one side such as at 48, with the bands of weld-inhibiting material applied to each of the sections so as to be disposed at 59 between each of the sections 54 of sheet 1" and outer component sheet 2, at 60 between each corresponding pair of sections 54 and 55 of respective inner component sheets 1" and 1'", and at 61 and 62 between each section 55 of sheet 1'" and corresponding portions of outer component sheet 3. However, to obtain the plaits in this embodiment, the band free of weld-inhibiting material 63 provided between the surfaces of sheet 2 and the sections 54 of sheet 1" is much wider than the band free of weld-inhibiting material 64 provided between the surfaces of sections 55 of sheet 1'" and corresponding portions of outer component sheet 3.

Although the invention has been described with reference to specific embodiments, materials and details, various modifications and changes, within the scope of the invention, will be apparent to one skilled in the art and are contemplated to be embraced within the invention.

What is claimed is:

1. In the method of making a hollow metal article having opposed walls spaced by integral reinforcing ribs transverse said walls, each of said ribs passing from one of said opposed walls to the other of said opposed walls, by pressure welding a stack of components comprised of a pair of outer sheets and at least one inner sheet partially coated with weld-inhibiting material with said inner sheets being interposed between said outer sheets, the steps which comprise providing a plurality of parallel weakened portions in said inner sheet by scoring said inner sheet along a plurality of laterally spaced lines extending in a direction longitudinally across said inner sheet parallel to a pair of opposite edges of said inner sheet whereby said scoring divides said inner sheet into a plurality of sections for the formation of said ribs, partially coating said section with said material with said coating applied to each of said sections in a pattern providing between successive adjacent surfaces of said sheets a band of said material parallel to said scoring and a band free of said material parallel to said scoring, said band of material at successively alternate lateral edges defining said sections on one side of said section with like bands on the opposite side thereof with the bands arranged in staggered and overlapping relationship, forming said stack by assembling said inner sheet between said outer sheets with all said sheets disposed in face-to-face contact with adjacent sheets, pressure welding said stack, and thereafter spacing apart said outer sheets under sufficient force to tear said inner sheet along its said weakened portions and to erect said sections into said ribs.

2. In the method of making a hollow metal article having opposed walls spaced by integral reinforcing ribs transverse said walls, each of said ribs passing from one of said opposed walls to the other of said opposed walls, by pressure welding a stack of components comprised of a pair of outer sheets and at least one inner sheet partially coated with weld-inhibiting material with said inner sheet being interposed between said outer sheets, the steps which comprise providing a plurality of parallel weakened portions in said inner sheet by scoring said inner sheet along a plurality of lines spaced from each other and extending across said sheet in a direction parallel to a pair of opposite edges of said inner sheet whereby said scoring divides said inner sheet into a plurality of sections for the formation of said ribs applying said material to each of said sections to provide thereon bands free of said material parallel to said scoring and bands of said material parallel to said scoring on one side of said section with like bands on the opposite side thereof with the bands arranged in staggered and overlapping relationship, forming said stack by assembling said inner sheet between said outer sheets with all said sheets disposed in face-to-face contact with adjacent sheets, pressure welding said sheets together in their adjacent areas not separated by said material, and thereafter spacing apart said outer sheets under sufficient force to tear said inner sheet along its weakened portions and to unfold into said ribs.

3. The method of claim 8 wherein at least two inner sheets are interposed between said outer sheets with said weakened portions of one inner sheet being in superposed relationship to corresponding weakened portions of the inner sheet adjacent thereto and wherein the bands of said material between successive adjacent surfaces of said inner sheets overlap.

4. In the method of making a hollow metal article having opposed walls spaced by integral reinforcing ribs transverse said walls, each of said ribs passing from one of said opposed walls to the other of said opposed walls, by pressure welding a stack of components comprised of a pair of outer sheets and at least one inner sheet partially coated with weld-inhibiting material with said inner sheet being interposed between said outer sheets, the steps which comprise providing a plurality of parallel weakened portions in said inner sheet by scoring said inner sheet along a plurality of lines spaced from each other and extending across said sheet in a direction parallel to a pair of opposite edges of said inner sheet whereby said scoring divides said inner sheet into a plurality of sections for the formation of said ribs, applying on both sides of said sections bands of said material parallel to said scoring and bands free of said material parallel to said scoring in a pattern providing in said stack a band of said material between one of said sides of each of said sections and a sheet adjacent thereto in staggered and overlapping relation to a band of said material between the other of said sides of each of said sections and the sheet adjacent thereto, forming said stack by assembling said inner sheet between said outer sheets with all said sheets disposed in face-to-face contact with adjacent sheets, pressure welding said stack, and thereafter spacing apart said outer sheets under sufficient force to tear said inner sheet along its said weakened portions and to erect said sections into said ribs.

References Cited in the file of this patent
UNITED STATES PATENTS

| | | |
|---|---|---|
| 2,258,610 | Hothersall | Oct. 14, 1941 |
| 2,766,514 | Adams | Oct. 16, 1956 |
| 2,944,328 | Adams | July 12, 1960 |

UNITED STATES PATENT OFFICE
CERTIFICATE OF CORRECTION

Patent No. 3,112,559            December 3, 1963

Theron F. Pauls

It is hereby certified that error appears in the above numbered patent requiring correction and that the said Letters Patent should read as corrected below.

Column 5, line 67, after "sheet 1" insert -- which --; column 8, line 73, for the claim reference numeral "8" read -- 2 --.

Signed and sealed this 23rd day of June 1964.

(SEAL)
Attest:

ERNEST W. SWIDER
Attesting Officer

EDWARD J. BRENNER
Commissioner of Patents